Patented Oct. 30, 1923.

1,472,321

UNITED STATES PATENT OFFICE.

ERNST BECKMANN, OF BERLIN-DAHLEM, GERMANY, ASSIGNOR, BY MESNE ASSIGNMENTS, TO THE CHEMICAL FOUNDATION, INC., A CORPORATION OF DELAWARE.

PROCESS OF PREPARING A FODDER FROM STRAW OR OTHER MATERIALS CHARACTERIZED BY THEIR CONTENTS OF RAW FIBERS.

No Drawing. Application filed April 15, 1919. Serial No. 290,335.

(GRANTED UNDER THE PROVISIONS OF THE ACT OF MARCH 3, 1921, 41 STAT. L., 1313.)

*To all whom it may concern:*

Be it known that I, Professor Dr. ERNST BECKMANN, a citizen of the State of Germany, and residing at Berlin-Dahlem, Thielallee 63, Germany, have invented certain new and useful improvements in or relating to a process for preparing a fodder from straw or other materials characterized by their contents of raw fibers (for which I have filed applications in Germany, March 28, 1918; Denmark, January 18, 1919; Austria, January 20, 1919; Hungary, January 20, 1919; Norway, February 5, 1919; and France, February 10, 1919), of which the following is a specification.

In a co-pending application there is set forth a method for the preparation of a fodder from straw and similar materials by disintegrating the same, after it has been cut into small pieces, by means of caustic alkali according to which the caustic alkali acts upon the straw at ordinary temperature, that is, about 20° C. In this process not any additional heat is required and the action continues for a period of time depending upon the concentration of the caustic.

I have now found that the disintegration of straw may be satisfactorily accomplished by utilizing alkaline sulphides at a low temperature in place of the caustic alkalies. The alkaline sulphides in the presence of water dissociate into the corresponding sulph-hydrates and their effectiveness and action is due to this dissociation.

The process may be of more particular importance when the alkaline sulphides are obtainable as by-products in other operations, either pure or admixed with the hydroxides of sodium or potassium. They may thus be economically and practically employed. Furthermore, the sulphides may be used in conjunction with the hydroxides of sodium or potassium, that is, in a solution containing the two compounds. Likewise the sulphides may be used in conjunction with hydroxide of calcium, in which case the alkaline sulphides give an alkaline liquor both by hydrolysis and by reaction with the calcium hydroxide.

In order to utilize my process in a practical manner, I may proceed as follows: 100 ks. of straw are placed and allowed to soak in about 1000 to 2000 ls. of water. To the thus-treated straw there is then added about 5 ks. of an alkaline sulphide such as, for example, sodium sulphide. The mixture is allowed to stand for several hours with frequent stirring, and after allowing the solvent material to settle the supernatant liquid is drawn off and the straw thoroughly washed with water. The straw which has thus been preliminarily treated may then be subsequently treated with a solution containing caustic alkali by means of which the disintegration is completed. However, instead of making use of an alkaline sulphide per se, it has been found that satisfactory results accrue when a portion of the alkaline sulphide has been replaced by calcium hydroxide, and in accordance therewith a mixture containing about 3 ks. of sodium sulphide and 3 ks. of calcium hydroxide may be employed in place of the sodium sulphide as above stated, and the preceding and succeeding steps in the operation would be identical with those given above.

The process is applicable not only to straw, but may be applied equally well to other materials having a composition similar to that of straw and characterized by their content of raw fibers such as rush, forest grass, Indian corn stalks, chaff and the like.

I claim:

1. The process for preparing a fodder from straw and other material characterized by its content of raw fiber which comprises cutting the material into small pieces and then treating the material with an alkaline sulphide at ordinary temperature.

2. The process for preparing a fodder from straw and other material characterized by its content of raw fiber which comprises cutting the material into small pieces and then treating the material with an aqueous solution of an alkaline sulphide at ordinary temperature.

3. The process for preparing a fodder from straw and other material characterized by its content of raw fiber which comprises cutting the material into small pieces and then treating the material with an aqueous solution of an alkaline sulphide and a free alkali at ordinary temperature.

4. The process for preparing a fodder from straw and other material characterized by its content of raw fiber which comprises cutting the material into small pieces and then treating the material with an aqueous solution of an alkaline sulphide and calcium hydroxide at ordinary temperature.

In testimony whereof I have affixed my signature in presence of two witnesses.

PROF. DR. ERNST BECKMANN.

Witnesses:
M. BLUMENREICH,
BRUNO BROCK.